US008134337B2

(12) United States Patent
Morita

(10) Patent No.: US 8,134,337 B2
(45) Date of Patent: Mar. 13, 2012

(54) ELECTRICITY STORAGE DEVICE HAVING EQUALIZATION VOLTAGE CIRCUIT

(75) Inventor: Kazuki Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 404 days.

(21) Appl. No.: 12/307,169

(22) PCT Filed: Jul. 25, 2007

(86) PCT No.: PCT/JP2007/064538
§ 371 (c)(1),
(2), (4) Date: Dec. 31, 2008

(87) PCT Pub. No.: WO2008/015933
PCT Pub. Date: Feb. 7, 2008

(65) Prior Publication Data
US 2009/0261782 A1 Oct. 22, 2009

(30) Foreign Application Priority Data
Aug. 4, 2006 (JP) .................................. 2006-213168

(51) Int. Cl.
*H02J 7/00* (2006.01)
(52) U.S. Cl. .......................... 320/118; 320/119; 320/121
(58) Field of Classification Search .................... 320/118
See application file for complete search history.

(56) References Cited

U.S. PATENT DOCUMENTS

| 5,504,415 A * | 4/1996 | Podrazhansky et al. ...... 320/118 |
| 5,602,481 A | 2/1997 | Fukuyama | |
| 6,133,710 A | 10/2000 | Okamura | |
| 7,453,237 B2 * | 11/2008 | Yamamoto ..................... 320/118 |
| 7,609,030 B2 * | 10/2009 | Uesugi et al. .................. 320/118 |
| 2005/0127873 A1 * | 6/2005 | Yamamoto et al. ........... 320/116 |
| 2006/0103351 A1 * | 5/2006 | Tanigawa et al. ............. 320/118 |
| 2007/0188138 A1 | 8/2007 | Kobayashi | |

FOREIGN PATENT DOCUMENTS

| JP | 7-255134 A | 10/1995 |
| JP | 07-322492 A | 12/1995 |
| JP | 2000-152508 A | 5/2000 |

(Continued)

OTHER PUBLICATIONS

International Search Report for PCT/JP2007/064538.

*Primary Examiner* — M'Baye Diao
(74) *Attorney, Agent, or Firm* — Pearne & Gordon LLP

(57) ABSTRACT

An electric storage device is disclosed, this device can balance voltages across each one of energy storage devices with each other in a short time even if the voltages disperse in a wide range, and also it can reduce needless power consumption. This device includes the energy storage devices and an equalizing voltage circuit coupled in parallel with the energy storage devices. The equalizing voltage circuit includes a balancing resistor, a balancing switch coupled between respective energy storage devices and respective balancing resistors, a discharging resistor coupled in parallel with the respective energy storage devices and having a smaller resistance value than the balancing resistor, and a discharging switch coupled between the respective energy storage devices and the respective discharging resistors. All the balancing switches and all the discharging switches are turned on during the charge to the energy storage devices, and after the voltages across the respective energy storage devices can be balanced with each other, all the discharging switches alone are turned off.

15 Claims, 14 Drawing Sheets

FOREIGN PATENT DOCUMENTS

| | | |
|---|---|---|
| JP | 2000-261977 A | 9/2000 |
| JP | 2001-186681 A | 7/2001 |
| JP | 2002-369400 A | 12/2002 |
| JP | 2006-115640 A | 4/2006 |
| JP | 2007-250521 A | 9/2007 |
| KR | 2003-0097104 A | 12/2003 |

* cited by examiner

ELECTRICITY STORAGE DEVICE HAVING EQUALIZATION VOLTAGE CIRCUIT

This application is a U.S. National Phase Application OF PCT International Application PCT/JP2007/064538.

TECHNICAL FIELD

The present invention relates to electric storage devices employing energy storage devices.

BACKGROUND ART

In recent years, cars have been equipped with an idling stop function which stops an engine when the car comes to a stop, or an electric power steering wheel which takes the load off the engine. These two items are environmental friendly and improve fuel efficiency. A hybrid system or an electric turbo system, which positively complements the drive of engine, will be used widely in the market. On top of that, car manufacturers have proposed various ideas about a car brake such as an electrical hydraulic brake that will replace a conventional mechanical hydraulic brake.

As discussed above, the car tends to need electric power increasingly from now on; however, a battery, having conventionally powered to the car, cannot supply an instantaneous large amount of power only by itself, so that it sometimes fails to supply sufficient power. If the battery becomes abnormal, the driving system possibly fails to operate normally.

To overcome the foregoing problems, an electric storage device is proposed as an auxiliary power supply for supplying enough power even when the battery becomes abnormal. The electric storage device is disclosed in, e.g. patent document 1.

FIG. 13 shows a schematic circuit diagram of one of the foregoing conventional electric storage devices. In this circuit, each one of energy storage device cells 110 is formed of an electrically double-layered energy storage device having large capacitance, and it is employed as an electric storage element. Multiple energy storage device cells 110 are coupled together in series to form energy storage device pack 112, which is coupled with a power supply such as a battery for charging energy storage device cells 110.

Each one of energy storage device cells 110 is coupled in parallel with a load, e.g. balancing resistor 114, in order to balance the voltages across each cell 110 with each other. Between energy storage device cell 110 and resistor 114, relay switch 116 is connected. Relay switch 116 is formed of a regular-open type relay-contact 116a working as a switch section and electromagnetic coil 116b driving the switch section. Electromagnetic coil 116b is coupled in parallel between the power supply and the ground, and accessory switch 118 is coupled to the power supply. A turn-on of switch 118 thus drives every electromagnetic coil 116b, thereby turning on every relay switch 116.

The work of the foregoing electric storage device is described hereinafter. When a car is started up, accessory switch 118 is turned on with an ignition key, and then every relay switch 116 is turned on as discussed above. Energy storage device cell 110 and balancing resistor 114 are thus coupled together in parallel, so that the power supply starts charging respective energy storage device cells 110. The voltages across each one of energy storage device cells 110 are adjusted automatically to be equal by respective balancing resistors 114. This mechanism allows preventing an overcharge to energy storage device cell 110, so that a longer service life of energy storage device cell 110 can be expected.

When the car stops, accessory switch 118 is turned off, then every relay switch 116 is turned off, so that energy storage device cell 114 is separated from balancing resistor 114. As a result, each one of energy storage device cells 114 becomes independent of the wiring, and cells 114 stand storing the electric charges which have been charged just before the car stops. Energy storage device cell 110 can be thus prevented from discharging needlessly electric charges, and can be kept storing the electric charges for a long period. The foregoing work of the electric storage device allows supplying enough power to restart the engine.

The electric storage device discussed above allows preventing an overcharge to energy storage device cell 110, and thus extending its service life. It also allows reducing needless discharge from energy storage device cell 110 during the halt of the car, and supplying enough power to restart the engine. However, if energy storage device cell 110 is left for a long time with the electric charges stored during the halt of the car, the stored electric charges spontaneously discharge, so that the voltages across respective energy storage device cells 100 lower gradually. Since energy storage device cells 110 have dispersion in their characteristics, the dispersion causes the spontaneous discharge to produce another dispersion in the voltages across respective cells 110. If the car is started up in this state, relay switch 116 is turned on, thereby connecting balancing resistor 114 to energy storage device cell 110, so that the dispersed voltages across respective cells 110 are adjusted automatically to a certain value by balancing resistor 114. FIG. 14 shows the time-varying progress of voltages across cells 110. In FIG. 14, the horizontal axis represents the time, and the vertical axis represents the voltages across respective energy storage device cells 110.

As shown in FIG. 14, at time "t0" when the car is started up, if the voltages across respective cells 110 disperse within the dispersive range, energy storage device cell 110 is charged while the disperse is adjusted, so that the voltages across respective cells 110 increase. At time "t2", the voltages across cells 110 become almost equal to each other, i.e. reach voltage V1.

Since a greater dispersive range needs a longer time t2 necessary to reach voltage V1, when the car is left halting only for a short time, the dispersive range becomes small, so that the conventional electric storage device allows reaching voltage V1 within a relatively short time. However, if the car is left halting for a long time, the disperse in spontaneous discharge of energy storage device cell 110 causes the time span (hereinafter referred to as a balancing time) for balancing the voltages with each other to be extremely longer, such as in the order of several hours. This balancing time is determined by a time constant found from the capacitance of energy storage device cell 110 and the resistance value of balancing resistor 114. In this case, the capacitance of the electric storage device to be used as the auxiliary power supply to the car is already determined, so that the resistance value of balancing resistor 114 affects the balancing time.

A greater resistance value of resistor 114 is preferable for minimizing the discharge from energy storage device cell 110 and for reducing unnecessary power consumption; however, an excessively great resistance value will prolong the balancing time, so that the resistance value is obliged to set at a certain value. This setting necessarily incurs a problem that the balancing time at the start-up of the car becomes longer depending on a dispersive range, caused by leaving the car for a long time, of the voltages across energy storage device cells 110. As a result, energy storage device cell 110 is overcharged for a longer time before the voltages are balanced, so that the service life of energy storage device cell 110 is possibly shortened.

Patent Document 1: Unexamined Japanese Patent Application Publication No. H10-201091.

DISCLOSURE OF INVENTION

The present invention addresses the problems discussed above, and aims to provide an electric storage device that can balance the voltages across respective energy storage devices with each other in a short time although the voltages disperse in a wide range, and also can minimize needless power consumption.

To overcome the problems, the electric storage device of the present invention includes an equalizing voltage circuit coupled in parallel with each energy storage device, and the equalizing voltage circuit discharges a part of or the whole of a charging current while the energy storage device is charged. This discharge is carried out from the start of the charge until a given time (t1) or until the voltages of the energy storage devices reach a given voltage (V1). Then the equalizing voltage circuit decreases the discharging current for charging the energy storage devices.

The foregoing structure allows the equalizing voltage circuit to discharge a part of or the whole of the charging current, thereby discharging a part of the power stored in the energy storage devices even if the voltages across the respective energy storage devices disperse in a wide range during the charge to the energy storage device. When the given time "t1" is passed or a given voltage "V1" is cleared, either one of these two is a condition to balance the voltages with each other, the equalizing voltage circuit then decreases the discharge current in order to charge the energy storage devices. As a result, the voltages can be balanced within a short time even if the dispersive range is wide, so that needless power consumption can be reduced.

An electric storage device of the present invention includes an equalizing voltage circuit which comprises the following elements:
  a balancing resistor coupled in parallel with each one of energy storage devices or
  a balancing resistor coupled in parallel with each group of multiple energy storage devices;
  a balancing switch coupled between an end of each one of the energy storage devices and each one of the balancing resistors;
  a discharging resistor having a smaller resistance value than the balancing resistor and coupled in parallel with each one of the balancing resistors via a discharging switch; and
  a controller for measuring voltages across the respective energy storage devices coupled to the equalizing voltage circuit, thereby controlling the on-off of the balancing switch and the discharging switch.

The foregoing structure allows a control of reducing an amount of discharge from any energy storage device when a difference between a voltage across this any energy storage device and a present voltage across the energy storage device having the minimum voltage among other energy storage devices falls within a given range during the charge. On top of that, this control can be repeated until every discharging switch is turned off. Thus respective energy storage devices can be charged sequentially in accordance with the charging characteristics of the energy storage device having the minimum voltage. As a result, even if a dispersive range of voltages across the respective energy storage devices is great, the voltages can be balanced with each other within a shorter time, and needless power consumption can be further reduced.

An electric storage device of the present invention includes an equalizing voltage circuit which comprises the following elements:
  a balancing resistor coupled in parallel with each one of energy storage devices or
  a balancing resistor coupled in parallel with each group of multiple energy storage devices;
  a balancing switch coupled between an end of each one of the energy storage devices and each one of the balancing resistors;
  a discharging resistor having a smaller resistance value than the balancing resistor and coupled in parallel with each one of the energy storage devices;
  a discharging switch coupled between an end of each one of the energy storage devices and each one of the discharging resistors; and
  a controller for measuring voltages across the respective energy storage devices coupled to the equalizing voltage circuit, thereby controlling the on-off of the balancing switch and the discharging switch.

The foregoing structure also allows a control of reducing an amount of discharge from any energy storage device when a difference between a voltage across this any energy storage device and a present voltage across the energy storage device having the minimum voltage among other energy storage devices falls within a given range during the charge. On top of that, this control can be repeated until every discharging switch is turned off. Thus respective energy storage devices can be charged sequentially in accordance with the charging characteristics of the energy storage device having the minimum voltage. As a result, even if a dispersive range of voltages across the respective energy storage devices is great, the voltages can be balanced with each other within a shorter time, and needless power consumption can be further reduced.

The foregoing electric storage devices of the present invention allow discharging a part of or the whole of the power stored during the charge to the energy storage devices, so that the voltages across the respective energy storage devices can be balanced with each other within a short time even if the dispersive range of the voltages across the energy storage devices is great. After the voltages are balanced with each other, the discharging current is reduced for charging the energy storage devices, so that needless power consumption thereafter can be reduced.

DESCRIPTION OF REFERENCE MARKS

Figure 1:
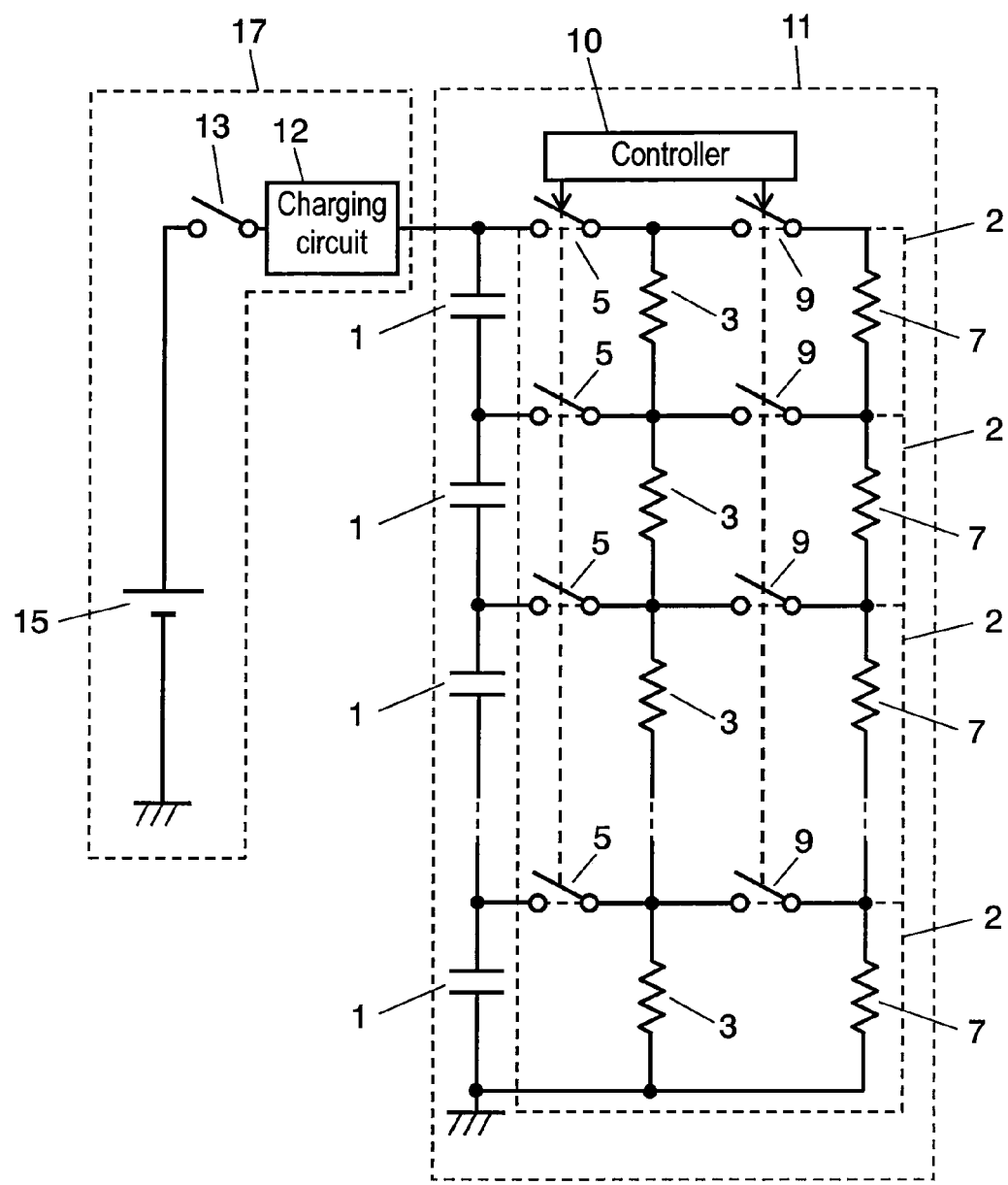
FIG. 1 shows a schematic circuit diagram of an electric storage device in accordance with a first embodiment of the present invention.

1 energy storage device
2 equalizing voltage circuit
3 balancing resistor
5 balancing switch
7 discharging resistor
9 discharging switch
10 controller
11 electric storage device

PREFERRED EMBODIMENTS OF THE INVENTION

Exemplary embodiments of the present invention are demonstrated hereinafter with reference to the accompanying drawings. An electric storage device employed in a car is demonstrated; however, the present invention is not limited to the following embodiments.

Embodiment 1

Figure 2:
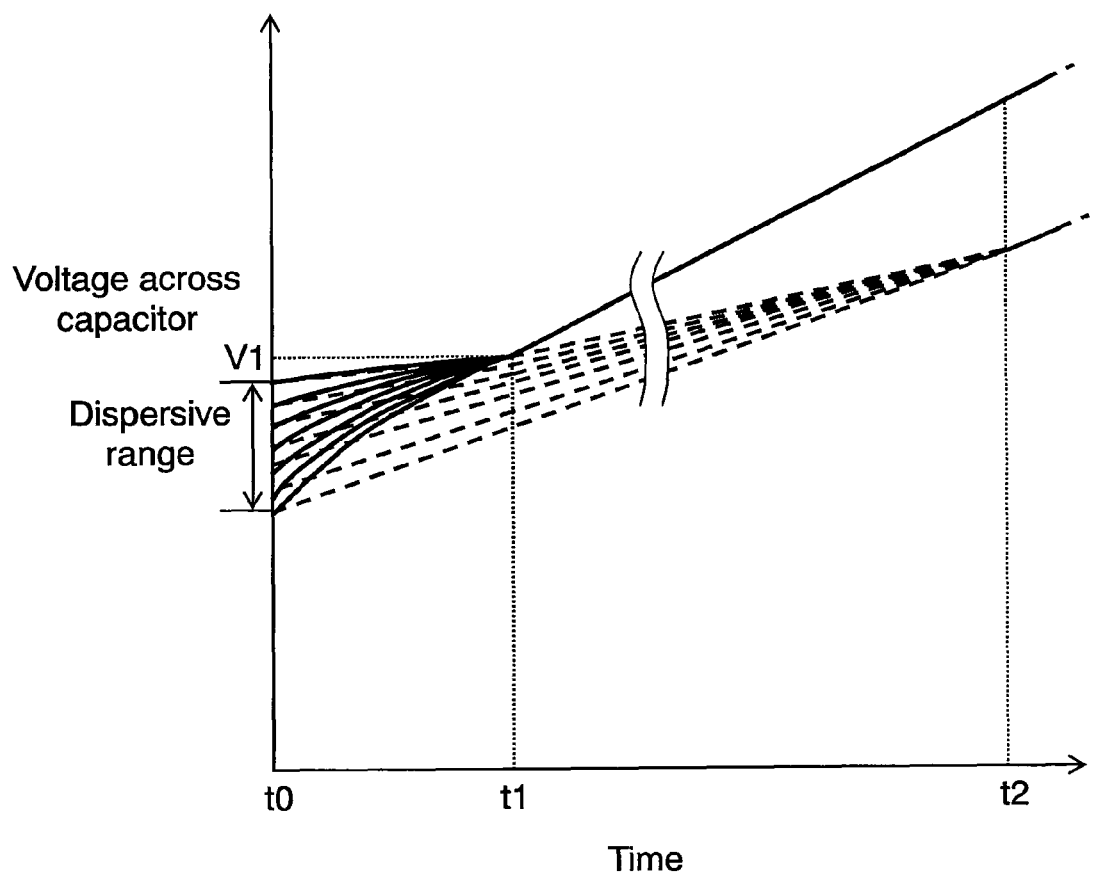
FIG. 2 shows a time-varying progress of voltages across respective energy storage devices in the case of a greater charging current than a discharging current of the electric storage device in accordance with the first embodiment of the present invention.
Figure 3:
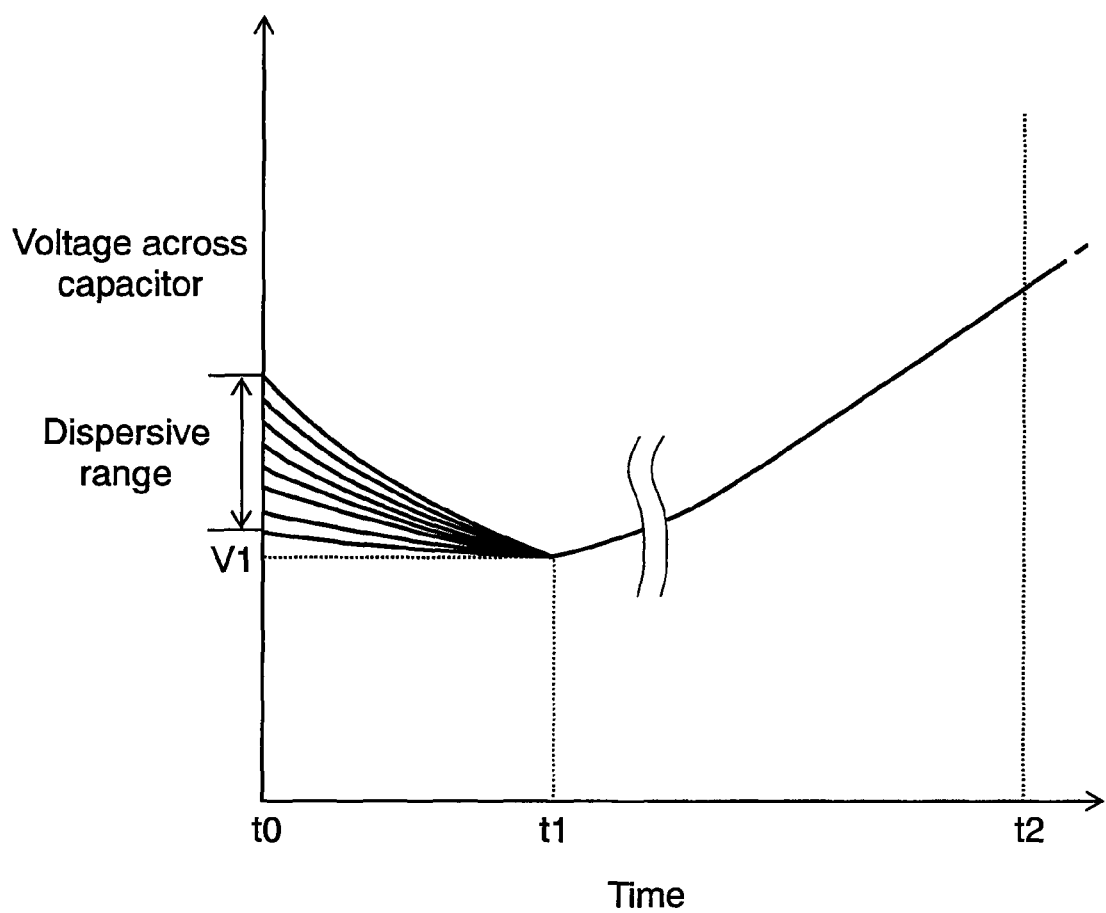
FIG. 3 shows a time-varying progress of voltages across the energy storage devices in the case of a smaller charging current than a discharging current of the electric storage device in accordance with the first embodiment of the present invention.
Figure 4:
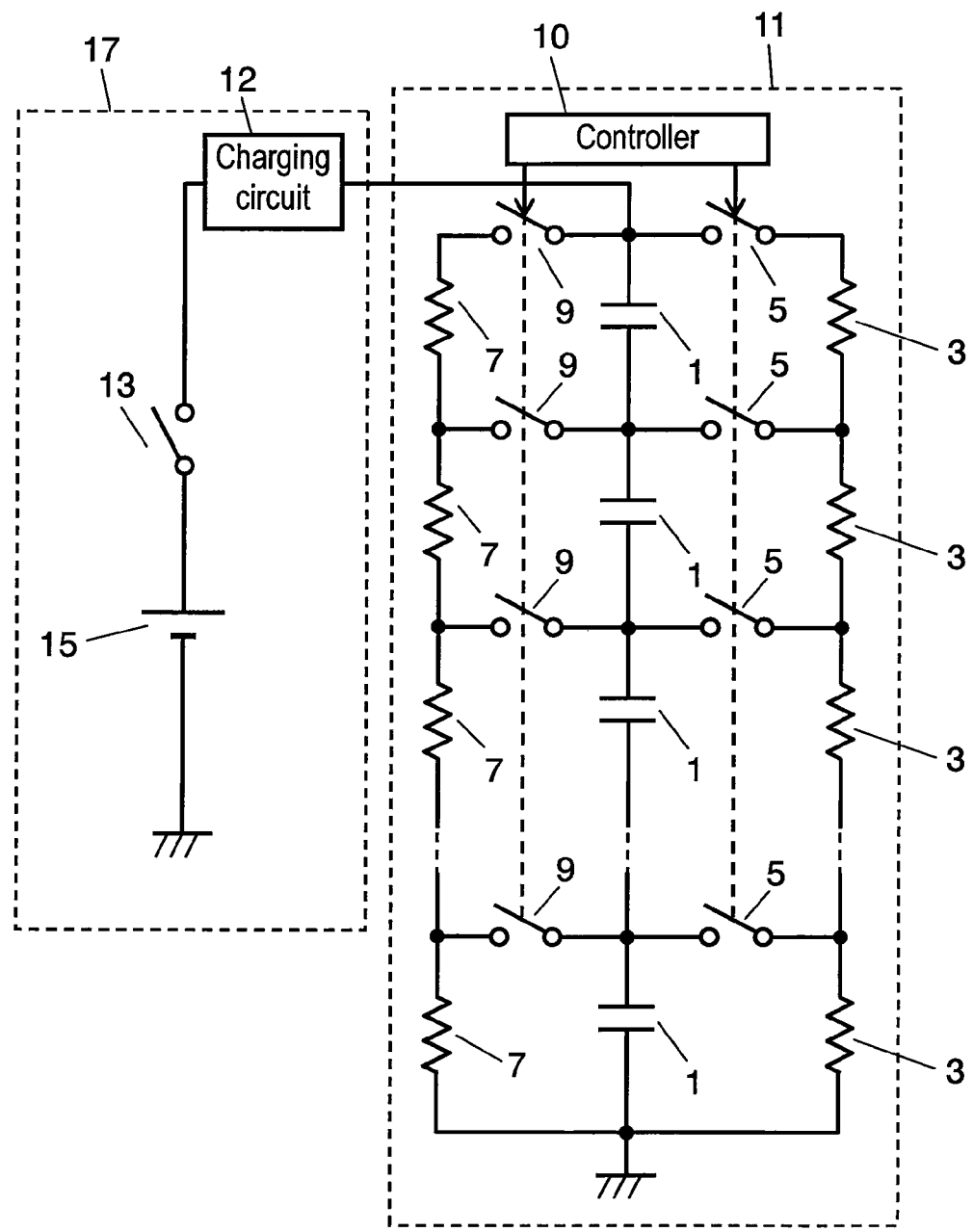
FIG. 4 shows another schematic circuit diagram of the electric storage device in accordance with the first embodiment of the present invention.

FIG. 1 shows a schematic circuit diagram of an electric storage device in accordance with the first embodiment of the present invention. FIG. 2 shows a time-varying progress of voltages across each one of energy storage devices in the case of a greater charging current than a discharging current of the electric storage device in accordance with the first embodiment of the present invention. FIG. 3 shows a time-varying progress of voltages across each one of the energy storage devices in the case of a smaller charging current than a discharging current of the electric storage device in accordance with the first embodiment of the present invention. FIG. 4 shows another schematic circuit diagram of the electric storage device in accordance with the first embodiment of the present invention.

In FIG. 1, energy storage device 1 is formed of electrically double-layered energy storage device of which rated voltage is 2.5V, and multiple energy storage devices 1 are coupled together in series for supplying a required power. Each one of energy storage devices 1 is coupled in parallel with equalizing voltage circuit 2 which comprises the following elements:

balancing resistor 3 coupled in parallel with each one of energy storage devices 1, wherein a resistance value of respective resistors 3 is set almost equal to each other, and an absolute value of the resistance value is set in the order of 100Ω in order to reduce a discharging current for balancing the voltages with each other as well as reducing needless power consumption;

balancing switch 5 coupled between an end of respective energy storage devices 1 and respective balancing resistors 3, wherein balancing switch 5 can be any type that is turned on or off from the outside as a conventional relay switch, and as shown with a dotted line in FIG. 1, respective balancing switches 5 are simultaneously turned on or off, discharging resistor 7 coupled in parallel with respective balancing resistors 3, so that resistor 7 can be coupled in parallel with energy storage device 1, wherein a resistance value of respective resistors 7 is set almost equal to each other, and an absolute value of the resistance value is smaller than the resistance value of balancing resistor 3. To be more specific, it is set at as small as several ohms, resultantly, balancing resistor 3 has a resistance value over 10 times greater than that of discharging resistance 7; and discharging switch 9 coupled to the wiring between energy storage device 1 and discharging resistor 7, wherein discharging switch 9 can be any type that is controlled on-off from the outside, and respective discharging switches 9 are also simultaneously turned on or off as shown with a dotted line in FIG. 1.

Equalizing Voltage Circuit 2 is Thus Constructed.

A simultaneous turn-on of balancing switch 5 and discharging switch 9 allows equalizing voltage circuit 2 to prompt energy storage device 1 to discharge the power to discharging resistor 7 in a form of a large current because the resistance value of discharging resistor 7 is extremely small. In this state, a turn-off of only discharging switch 9 allows reducing an amount of current (discharging current) discharged from energy storage device 1 because the resistance value of balancing resistor 3 is over 10 times greater than that of discharging resistor 7. Controller 10 controls the on-off of balancing switch 5 and discharging switch 9. The work of controller 10 will be detailed later.

Electric storage device 11 thus constructed is coupled to battery 15 via charging circuit 12 in charge of charging energy storage devices 1, and also via ignition switch 13 of the car. These three elements 12, 13, and 15 as a whole are referred to as charging device 17. Although it is not shown in the drawings, a load is coupled to electric storage device 11 for supplying electric power.

The work of foregoing electric storage device 11 is demonstrated hereinafter. When a car is started up, ignition switch 13 is turned on, and the power of battery 15 is controlled by charging circuit 12, thereby starting the charge to energy storage device 1. The turn-on of ignition switch 13 prompts controller 10 to turn on every balancing switch 5 as well as every discharging switch 9. The structure shown in FIG. 1 includes balancing resistor 3 coupled with discharging resistor 7 via discharging switch 9, so that balancing switch 5 should be turned on in addition to the turn-on of discharging switch 9 in order to discharge energy storage device 1 to discharging resistor 7 of which resistance value is small.

According to the foregoing discussion, each one of energy storage devices 1 is coupled in parallel with balancing resistor 3 and discharging resistor 7. The power stored in energy storage device 1 before the car stopped is thus discharged to balancing resistor 3 and discharging resistor 7. Since balancing resistor 3 has the resistance value greater than that of discharging resistor by over 10 times, a larger amount of current flows to discharging resistor 7.

The time-varying progress, in the above case, of the voltages across each one of energy storage devices 1 is shown in FIGS. 2 and 3, in which the horizontal axis represents the time and the vertical axis represents the voltages across the respective energy storage devices. FIG. 2 shows the case where a charging current at the start of the charge is greater than a discharging current flowing to discharging resistor 7. In this case, energy storage device 1 stores a small number of electric charges at the start of the car, so that although energy storage device 1 discharges to discharging resistor 7, a greater amount of current is charged to energy storage device 1 than the discharging amount. In actual, at a start of the charge, a part of the charging current is cancelled out by the discharging current flowing to discharging resistor 7, so that the part of the charging current seems to be discharged.

FIG. 3 shows a case where the charging current at the start of the charge is smaller than the discharging current flowing to discharging resistor 7. In this case, energy storage device 1 stores a large number of electric charges at the start of the car, so that although charging circuit 12 charges energy storage device 1, a greater amount of current is discharged to discharging resistor 7 than an amount of the charging current. In actual, at the start of the charge, the charging current is totally cancelled out by the discharging current flowing to discharging resistor 7, so that the entire charging current seems to be discharged.

First, the case shown in FIG. 2 is detailed hereinafter. Assume that the car is left for a long time, and the dispersion of the voltages across each one of energy storage devices 1 at the start-up (time "t0") of the car falls within the dispersive range shown in FIG. 2. In this state, since the charging current is greater than the discharging current, energy storage device 1 is charged until time "t1" and the voltages across respective energy storage devices 1 rise quickly to voltage V1 as shown with a solid line in FIG. 2. The time span between "t0" and "t1" is as short as several seconds in this first embodiment. Balancing time "t2" of a conventional electric storage device is shown with broken lines in FIG. 2, and the time span between "t0" and "t2" is something in the order of several hours. Thus "t1" is extremely shorter than "t2" because the resistance value of discharging resister 7 is so small that a large amount of current is discharged thereto, and the voltages across the respective energy storage devices 1 quickly reach the same value.

Next, the case shown in FIG. 3 is demonstrated hereinafter. Assume that the dispersion of the voltages across each one of energy storage devices 1 at the start-up of the car (time "t0") falls within the dispersive range shown in FIG. 3. At this time, since the discharging current is greater than the charging current, energy storage device 1 is discharged until time "t1", while the voltage across the respective energy storage devices 1 lower quickly to voltage V1. The time span between "t0" and "t1" is also as short as several seconds, and it is extremely shorter than the conventional balancing time "t2".

In this first embodiment, the voltages across each one of energy storage devices 1 can be balanced with each other by time "t1", and then every discharging switch 9 alone is turned off. Since balancing switches 5 are already turned on, they are kept as they are. This work allows reducing the discharging current from energy storage device 1. In this case, balancing switches 5 are kept turn-on, whereby the voltages of each one of energy storage devices 1 can be kept balanced with each other with a small amount of discharging current. Needless power consumption thus can be reduced as the conventional ones do. Energy storage device 1 can be prevented from being overcharged, so that a longer service life of energy storage device 1 can be expected.

The condition needed for turning on every discharging switch 9 as well as every balancing switch 5 is described hereinafter. The premise of these two actions is to balance the voltages across each one of energy storage devices 1 with each other. The simplest condition is this: Find time "t1" in advance, and then turn off discharging switches 9 and turn on balancing switches 5 at a lapse of time "t1".

However, this method possibly encounters a change in time "t1" due to a state of energy storage device 1 (temperature or progress in degradation). Therefore, more accurately, the voltage across energy storage device 1 is measured with a voltage detecting circuit (not shown), and the time when every voltage across every energy storage device 1 reaches the given voltage V1 is preferably set as the turn-on or turn-off time. It is difficult for every voltage across every energy storage device 1 to reach voltage V1 accurately, so that when they reach approximately voltage V1 within a permissible dispersive range, the next step discussed below can be taken.

Until either one of the conditions is satisfied, i.e. at a lapse of time "t1" from the start of the charge or at the time when the voltage of energy storage device 1 reaches voltage V1, every discharging switch 9 and every balancing switch 5 are turned on so that a part of or the whole of the charging current can be discharged with equalizing voltage circuit 2. Then controller 10 turns off every discharging switch 9 and turns on every balancing switch 5, whereby a large amount of current discharged by circuit 2 becomes extremely small just after the foregoing condition is satisfied. In this first embodiment, the large amount of current discharged by circuit 2 just after the start of the car is set to be greater by over 10 times than a consumption current after the condition is satisfied.

After the time "t1", energy storage device 1 is charged by the charging current supplied from charging circuit 12. In this case, the discharge to discharging resistor 7 is not carried out, and an extremely small current is discharged to balancing resistor 3, so that a charging voltage increases faster after time "t1".

Next, an action when the car is halted, i.e. the use of electric storage device 11 is brought to an end, is demonstrated hereinafter. The action is similar to that of the conventional one, namely, the turn-off of ignition switch 13 for stopping the car prompts controller 10 to turn off every discharging switch 9 and every balancing switch 5, so that energy storage device 1 is separated from balancing resistor 3 and from discharging resistor 7.

As a result, each one of energy storage devices 1 becomes independent of the wiring, so that no discharge occurs, and respective energy storage devices 1 store the electric charges that have been charged until just before the car is stopped. Needless discharge from energy storage device 1 can be thus prevented, and energy storage devices 1 can keep storing the electric charges for a long time, so that enough power to restart the engine can be supplied.

The structure and the work discussed above prove the following advantage: Discharging resistor 7 having a smaller resistance value than balancing resistor 3 is coupled in parallel with energy storage device 1, and a part of or the whole of the charging current is discharged to discharging resistor 7 during the charge of energy storage device 1, so that the voltages across each one of energy storage devices 1 can be balanced with each other. The structure and the work thus allow balancing the voltages with each other within a short time even if the voltages across respective energy storage devices 1 disperse widely. On top of that, needless power consumption can be reduced. The electric storage device of the present invention having the foregoing advantages is thus achieved.

In the circuit diagram of electric storage device 11 shown in FIG. 1, balancing resistor 3 is coupled across every energy storage device 1, and then discharging resistor 7 is coupled across every resistor 3. However, as shown in FIG. 4, discharging resistor 7 can be also coupled across every energy storage device 1 via only discharging switch 9 in addition to balancing resistor 3 coupled across every energy storage device 1. In other words, the electric storage device can comprise the following elements:

balancing resistor 3 coupled in parallel with each one of energy storage devices 1;

balancing switch 5 coupled between respective energy storage devices 1 and respective balancing resistor 3;

discharging resistor 7 having a smaller resistance value than balancing resistor 3 and coupled in parallel with respective energy storage devices 1; and discharging switch 9 coupled between respective energy storage devices 1 and discharging resistors 7.

The foregoing structure shown in FIG. 4 allows connecting respective discharging resistors 7 to respective energy storage devices 1 by simply turning on respective discharging switches 9, although the structure shown in FIG. 1 needs to turn on both of switches 5 and switches 9 for connecting resistors 7 to energy storage devices 1. As a result, the structure shown in FIG. 4 can employ switches 5 that withstand a small current because a large amount of current does not run through balancing switches 5. On the other hand, the structure shown in FIG. 1 needs to employ switches 5 capable of withstanding a large current because switches 5 possibly encounter a large current during the charge of energy storage devices 1.

The work of electric storage device 11 shown in FIG. 4 can be the same as that of device 11 shown in FIG. 1; however, it can be another way: When the voltages should be balanced with each other at the start-up of the charge, every discharging switch 9 alone is turned on, and then at a lapse of time "t1" or when respective voltages across energy storage devices 1 reach given voltage "V1", every discharging switch 9 is turned off and every balancing switch 5 is turned on for charging energy storage devices 1. Therefore, the structure shown in FIG. 1 needs to turn on every balancing switch 5 during the charge; however, the structure shown in FIG. 4 does not necessarily turn on balancing switches 5. Every balancing switch 5 can be thus turned on upon necessity depending on the circuit structure of electric storage device 11. When the use of electric storage device 11 is brought to an end, every balancing switch 5 and every discharging switch 9 are turned off in order to reduce needless power consumption.

Embodiment 2

Figure 5:
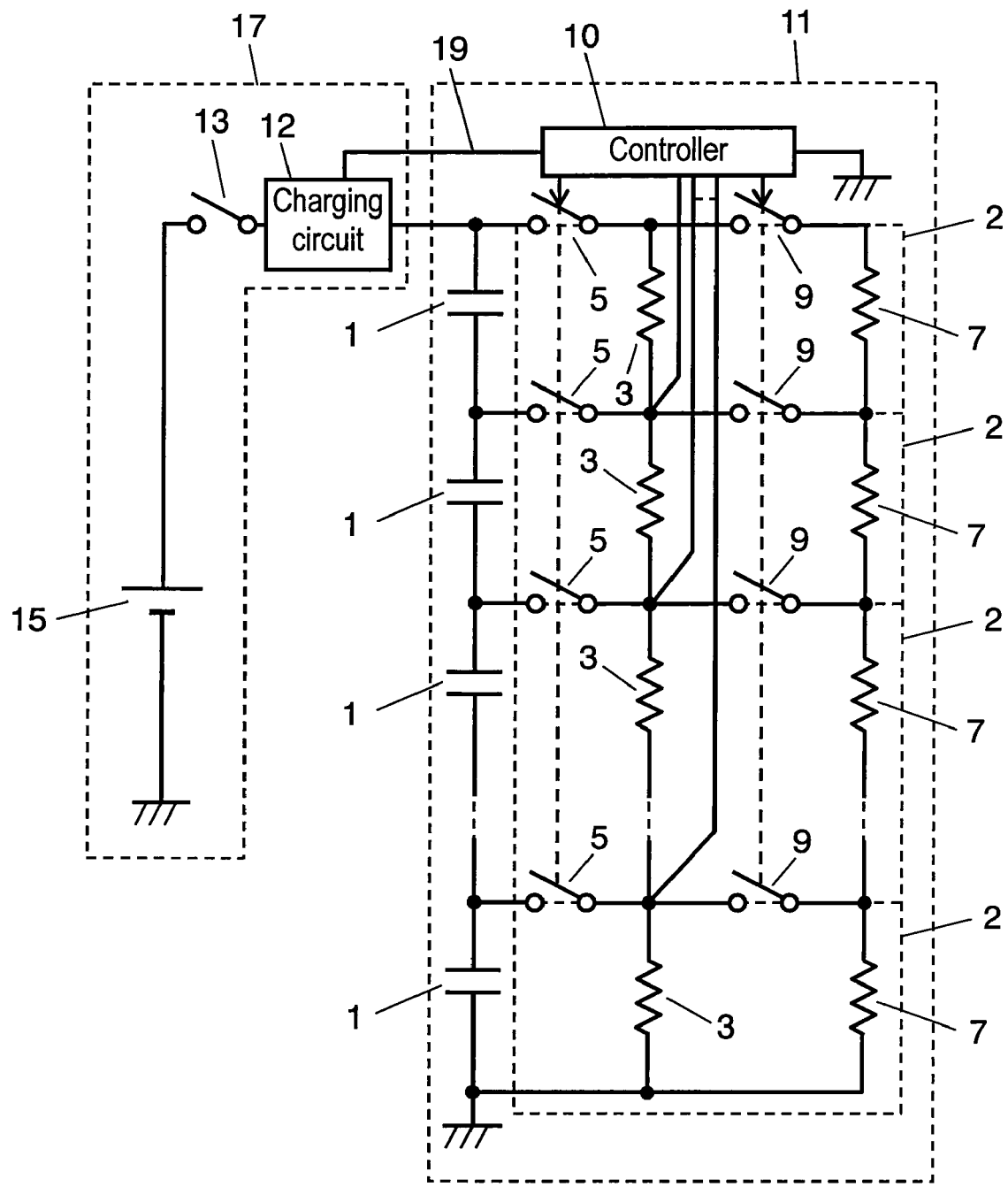
FIG. 5 shows a schematic circuit diagram of an electric storage device in accordance with a second embodiment of the present invention.
Figure 6:
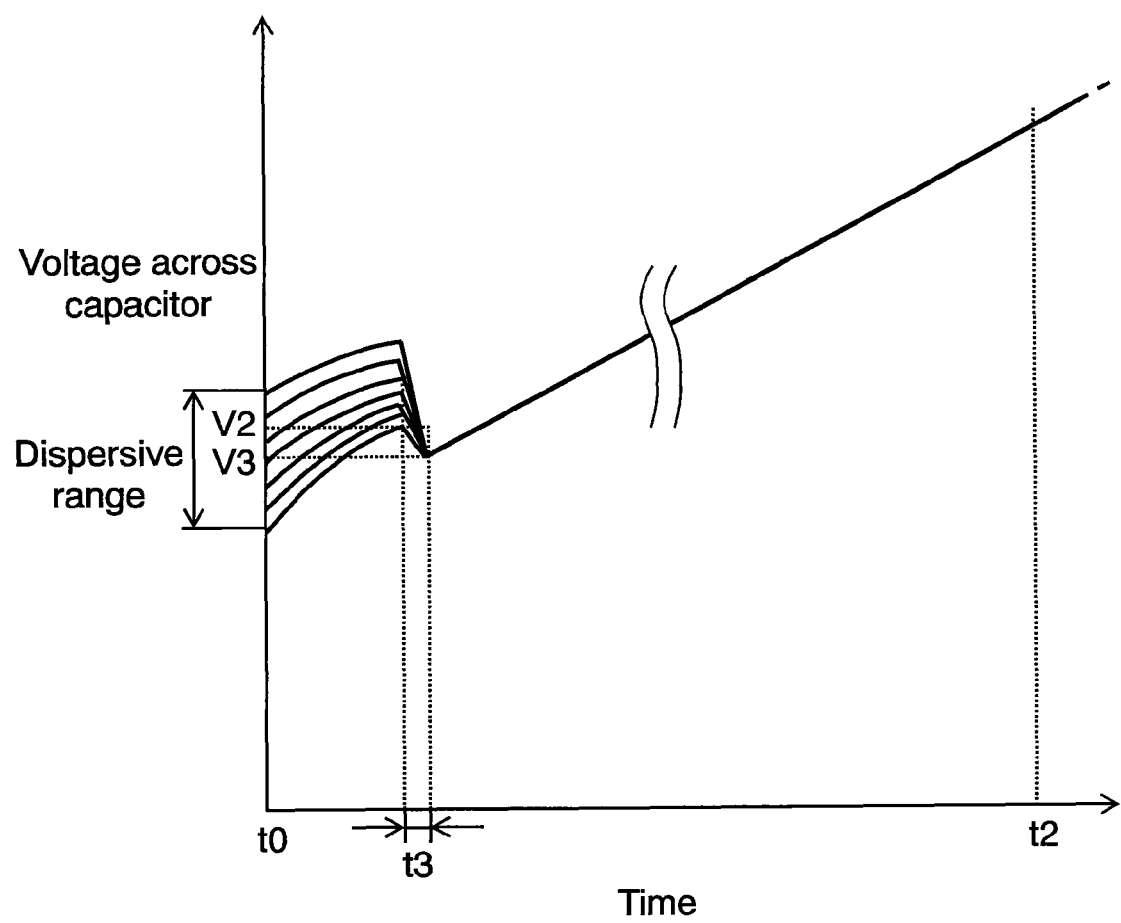
FIG. 6 shows a time-varying progress of voltages across respective energy storage devices of the electric storage device in accordance with the second embodiment of the present invention.
Figure 7:
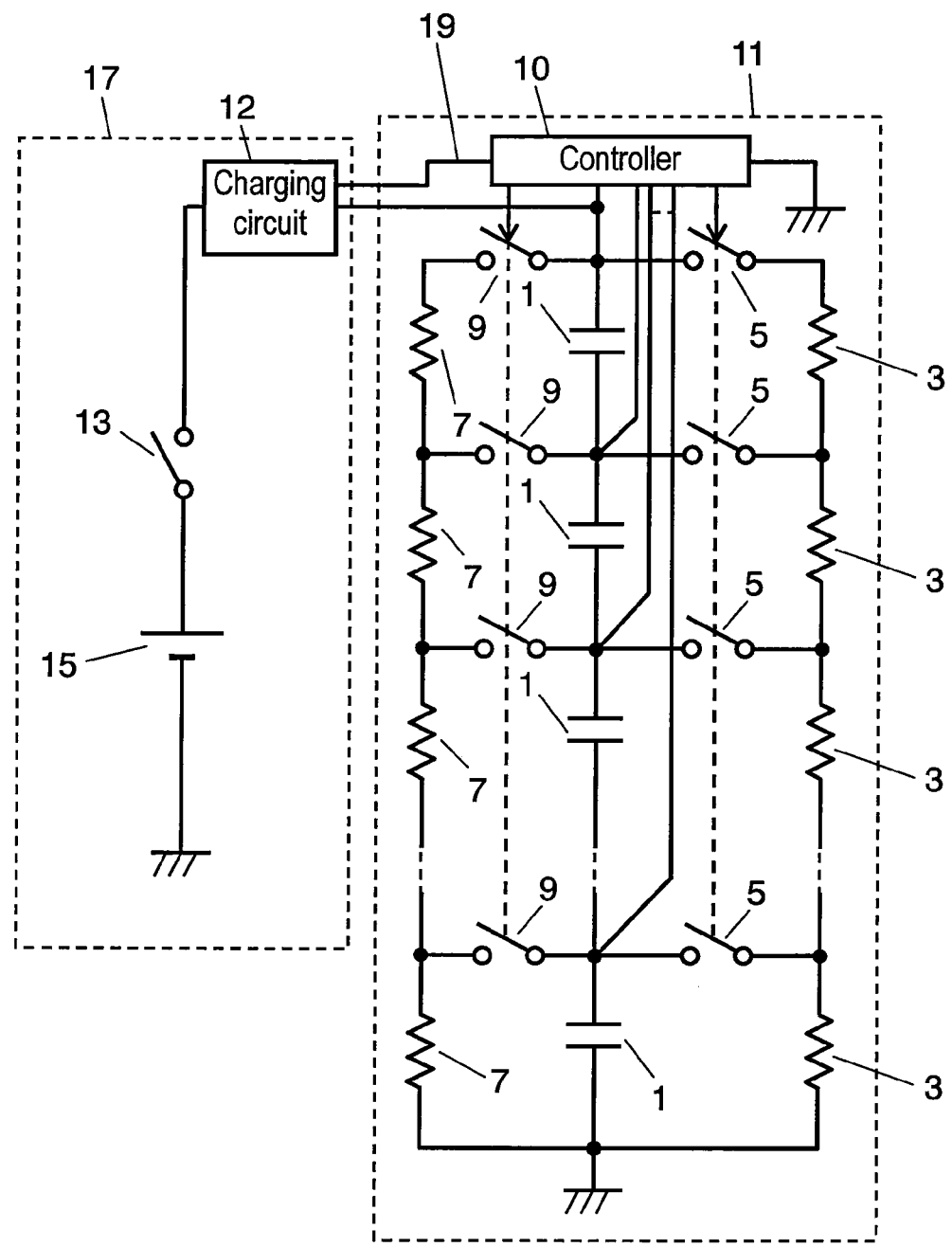
FIG. 7 shows another schematic circuit diagram of the electric storage device in accordance with the second embodiment of the present invention.

FIG. 5 shows a schematic circuit diagram of an electric storage device in accordance with the second embodiment of the present invention. FIG. 6 shows a time-varying progress of the voltages across respective energy storage devices of the electric storage device in accordance with the second embodiment of the present invention. FIG. 7 shows another schematic circuit diagram of the electric storage device in accordance with the second embodiment.

In FIG. 5, structural elements similar to those in FIG. 1 have the same reference marks, and the detailed descriptions thereof are omitted here. As shown in FIG. 5, the structural features of the second embodiment are the following two points: (1) Control wire 19 is coupled between controller 10 and charging circuit 12 so that controller 10 can control the on-off of an output from charging circuit 12. (2) Controller 10 can measure a voltage across energy storage device 1.

The work of the foregoing electric storage device is demonstrated hereinafter. When the car is started-up, ignition switch 13 is turned on, then the power of battery 15 is controlled by charging circuit 12, thereby charging energy storage device 1. Charging circuit 12 is capable of supplying a greater amount of charging current than an amount of the total current discharged from every energy storage device 1 when every discharging switch 9 and every balancing switch 5 are turned on. In other words, as described in FIG. 2 of the first embodiment, an amount of charging current is always set to be greater than an amount of the discharging current flowing to discharging resistor 7.

The turn-on of ignition switch 13 prompts controller 10 to turn on every balancing switch 5 and every discharging switch 9. This structure allows energy storage device 1 to discharge its power, which had been stored therein until the car stopped, to balancing resistor 3 and discharging resistor 7; however, since the resistance value of resistor 3 is greater than that of resistor 7 by over 10 times, a greater amount of current runs to discharging resistor 7.

FIG. 6 shows the time-varying progress of the voltages across respective energy storage devices 1. In FIG. 6, the horizontal axis represents the time, and the vertical axis represents the voltages across respective energy storage devices 1. Similar to the case shown in FIG. 2, at the start of charging energy storage device 1, since the amount of charging current is greater than the amount of discharging current flowing to discharging resistor 7, a part of the charging current is cancelled out by the discharging current flowing to discharging resistor 7, so that the charging current seems to be partially discharged.

Assume that the voltages across each energy storage device 1 disperse in the dispersive range as shown in FIG. 2, then since the charging current is greater than the discharging current, each energy storage device 1 is charged such that the voltage across energy storage device 1 disperses in a smaller range (the voltage rises). The voltages across every energy storage device 1 then exceed a required voltage V2 after a certain time. The required voltage V2 is set this way: Electric storage device 11 is required to output a certain minimum voltage, and each energy storage device 1 needs to output V3 in order to obtain this minimum output voltage. A given margin is added to this voltage V3 to make the required voltage V2. The margin can be set in advance based on the discharging characteristics of energy storage device 1.

At the time when the voltages across every energy storage device 1 exceed necessary voltage V2, the dispersion of the voltages does not yet fall within a small-enough range, so that controller 10 measures the voltages across every energy storage device 1, and turns off charging circuit 12 via control wire 19 when the voltages of across every energy storage device 1 exceeds required voltage V2. At this time, since every balancing switch 5 and every discharging switch 9 are kept turned on, the power stored in energy storage device 1 almost flows to discharging resistor 7, so that the voltages across every energy storage device 1 quickly lower.

The dispersion of the voltages across every energy storage device 1 thus can be reduced in an extremely short time "t3", and the voltages reach V3. Based on this fact, just after the given time "t3" is passed, or when the voltage of each energy storage device 1 reach approximately the given voltage V3, controller 10 turns on again the output of charging circuit 12 via control wire 19. At this time, since the voltages across each energy storage device 1 are balanced with each other, every discharging switch 9 is turned off simultaneously. Energy storage device 1 is then charged in this state, where discharging switches 9 remain turned-off, and the discharging current flows only to balancing resistor 3; however, the resistance value of balancing resistor 3 is greater than that of discharging resistor 7 by over 10 times, so that the foregoing control allows reducing the discharging current, thereby charging every energy storage device 1 efficiently. The condition for turning on charging circuit 12 again is that when the given time "t3" lapses, or when the voltages of each energy storage device 1 reach approximately given voltage "V3". The latter condition is preferable to the former one because it can produce a more accurate result as discussed in the first embodiment.

As discussed above, a tentative halt of the charge allows balancing the voltages with each other more quickly than the first embodiment does. Charging circuit 12 is set such that the voltage of energy storage device 1 necessarily rises at the start-up of the charge, so that the voltage quickly reaches required voltage V2, and on top of that, even if the tentative halt of the charge in this state invites a voltage drop from V2 to V3, the minimum output of electric storage device 11 is ensured, so that electric storage device 11 can be ready to work in a quick and positive manner.

An action when the car is halted, i.e. when the use of electric storage device 11 is brought to an end, is similar to that described in the first embodiment, namely, controller 10 turns off every balancing switch 5, and at this time, every discharging switch 9 remains turned-off, so that each one of energy storage devices 1 store the electric charges that have been charged until just before the car is stopped. Needless discharge from energy storage device 1 can be thus prevented, and energy storage device 1 can keep storing the electric charges for a long time.

The structure and the work discussed above allow electric storage device 11 to halt the charging current tentatively during the charge in addition to the controls carried out in the first embodiment. This tentative halt allows balancing the voltages across respective energy storage devices 1 with each other within a shorter time even if the dispersive range is great. On top of that, electric storage device 11 can reduce needless power consumption.

The circuit structure of electric storage device 11 shown in FIG. 5 can also comprise the following elements as shown in FIG. 7:

balancing resistor 3 coupled in parallel with each one of energy storage devices 1;
balancing switch 5 coupled between each one end of respective energy storage devices 1 and respective balancing resistors 3;
discharging resistor 7 having a smaller resistance value than balancing resistors 3 and coupled in parallel with respective energy storage devices 1; and
discharging switch 9 coupled between each one end of respective energy storage devices 1 and discharging resistors 7.

In this structure, control wire 19 is coupled between controller 10 and charging circuit 12. Other structures remain unchanged from the structure shown in FIG. 5. The foregoing structure allows producing an advantage similar to that described in the first embodiment demonstrated in FIG. 4.

The work of electric storage device 11 shown in FIG. 7 can be the same as that of device 11 shown in FIG. 5. However, when the voltages are balanced with each other at the start of the charge, every discharging switch 9 alone is turned on, and when each voltage across respective energy storage devices 1 exceeds required voltage V2 due to the charge, an output of charging circuit is turned off. Then when the given time "t3" lapses or each voltage of respective energy storage devices 1 reaches the given voltage V3, the output of charging circuit 12 is turned on, and at the same time, every discharging switch 9 is turned off, and every balancing switch 5 is turned on. In this state, energy storage device 1 can be charged. When the use of electric storage device 11 is brought to an end, every balancing switch 5 is turned off for reducing needless power consumption, as demonstrated in FIG. 5.

Embodiment 3

Figure 8:
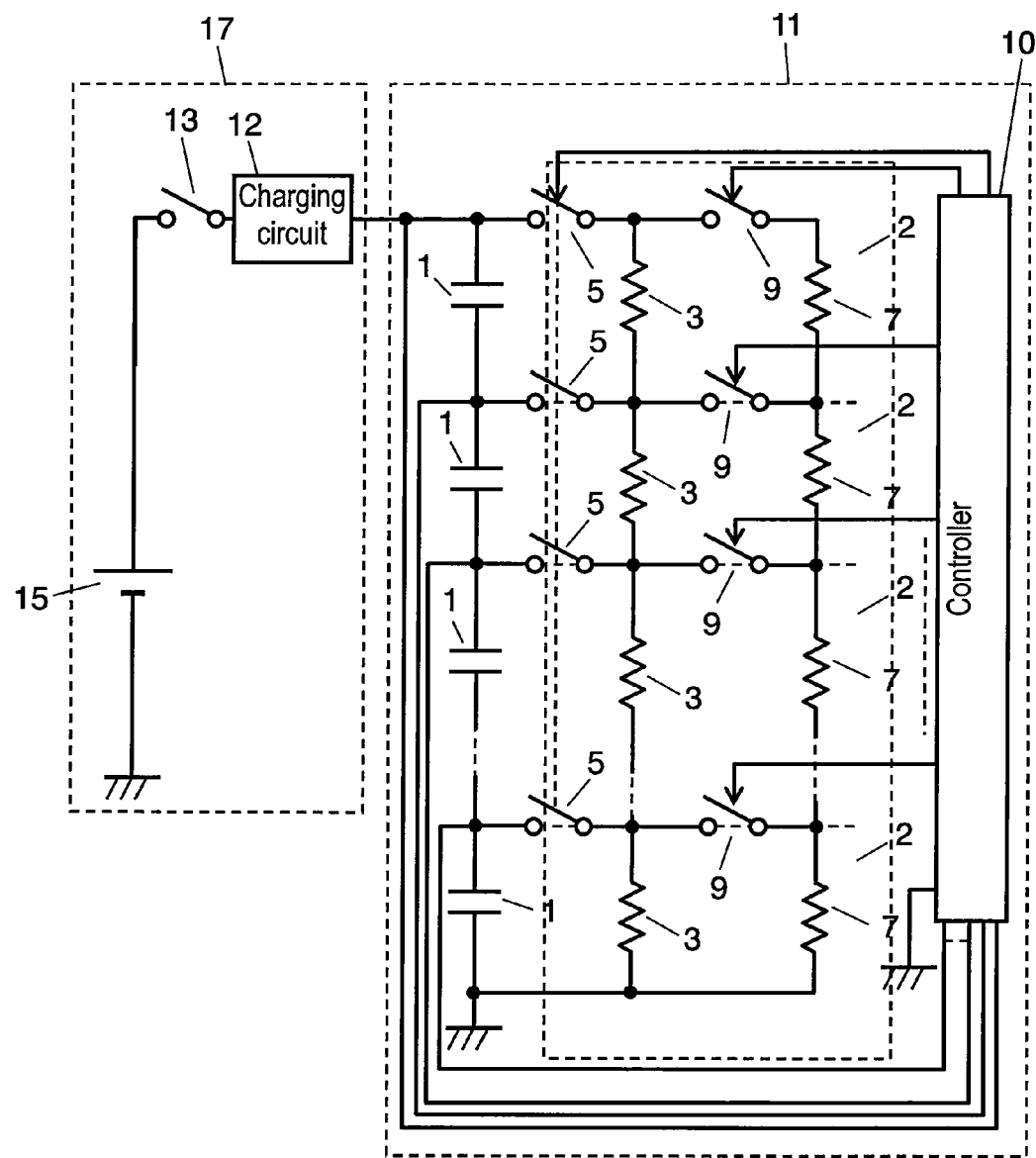
FIG. 8 shows a schematic circuit diagram of an electric storage device in accordance with a third embodiment of the present invention.
Figure 9:
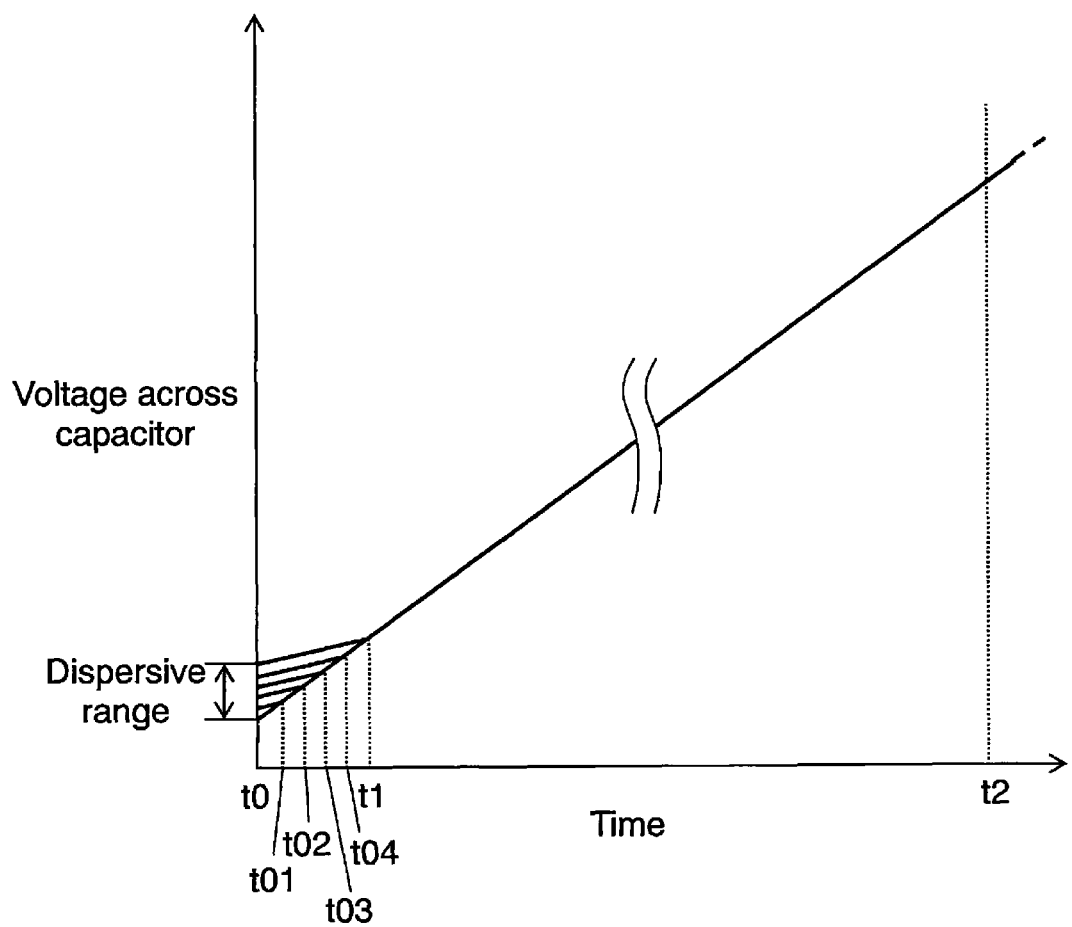
FIG. 9 shows a time-varying progress of voltages across energy storage devices in the case of a greater charging current than a discharging current of the electric storage device in accordance with the third embodiment of the present invention.
Figure 10:
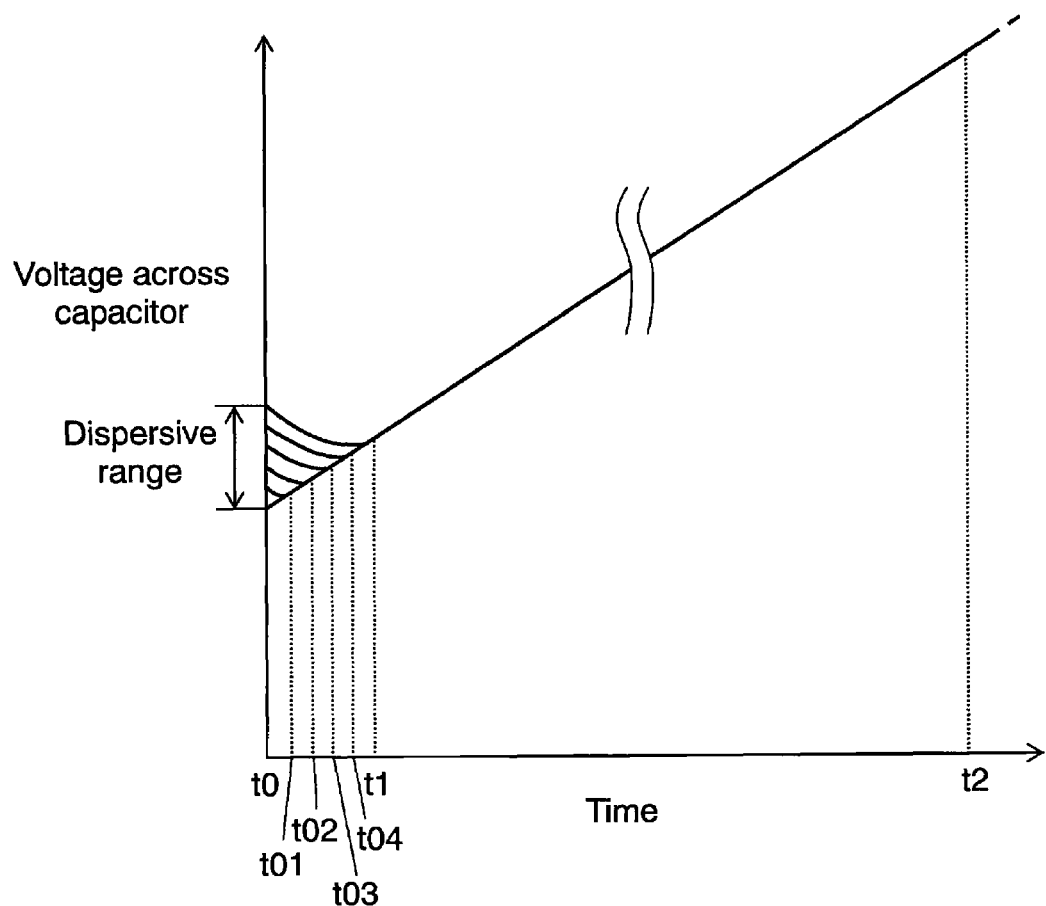
FIG. 10 shows a time-varying progress of voltages across respective energy storage devices in the case of a smaller charging current than a discharging current of the electric storage device in accordance with the third embodiment of the present invention.
Figure 11:
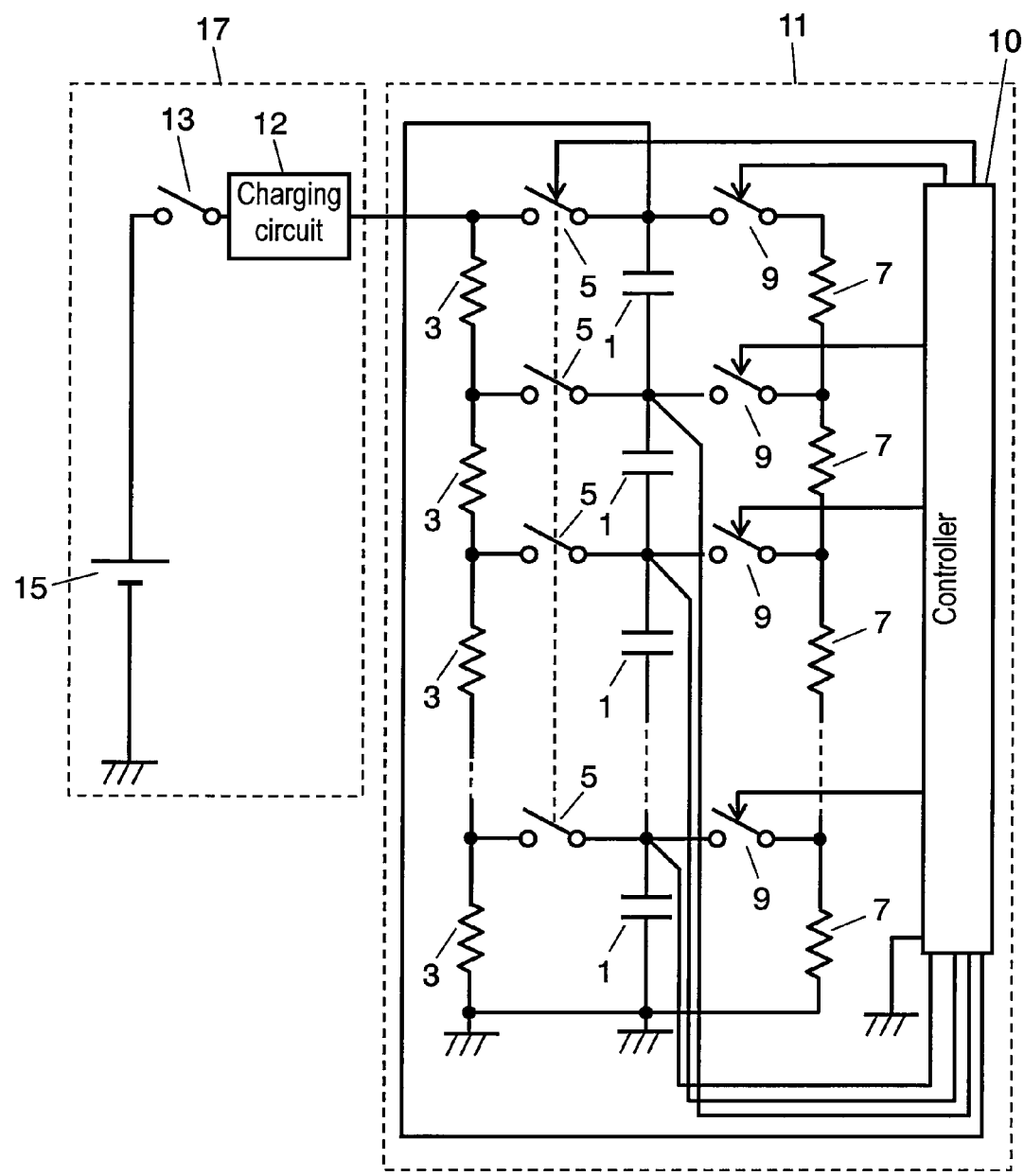
FIG. 11 shows another schematic circuit diagram of the electric storage device in accordance with the third embodiment of the present invention.
Figure 12A:
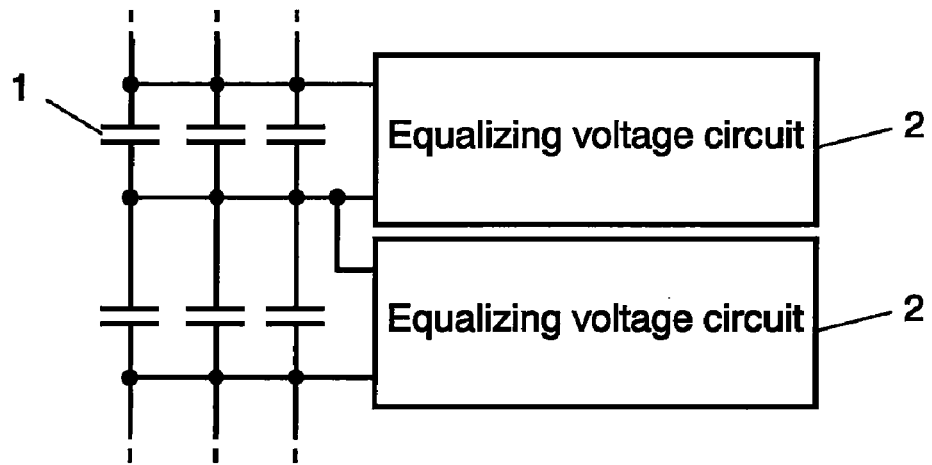
FIG. 12A shows a connection circuit where multiple energy storage devices are coupled in parallel with a single equalizing voltage circuit.
Figure 12B:
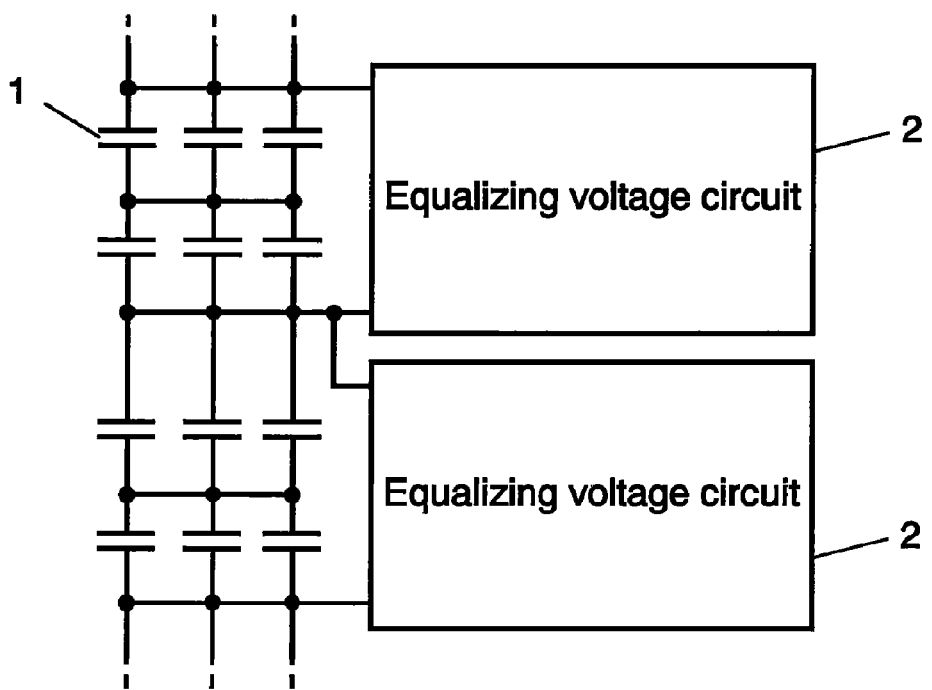
FIG. 12B shows a connection circuit where multiple energy storage devices are coupled in series-parallel to a single equalizing voltage circuit.
Figure 13:
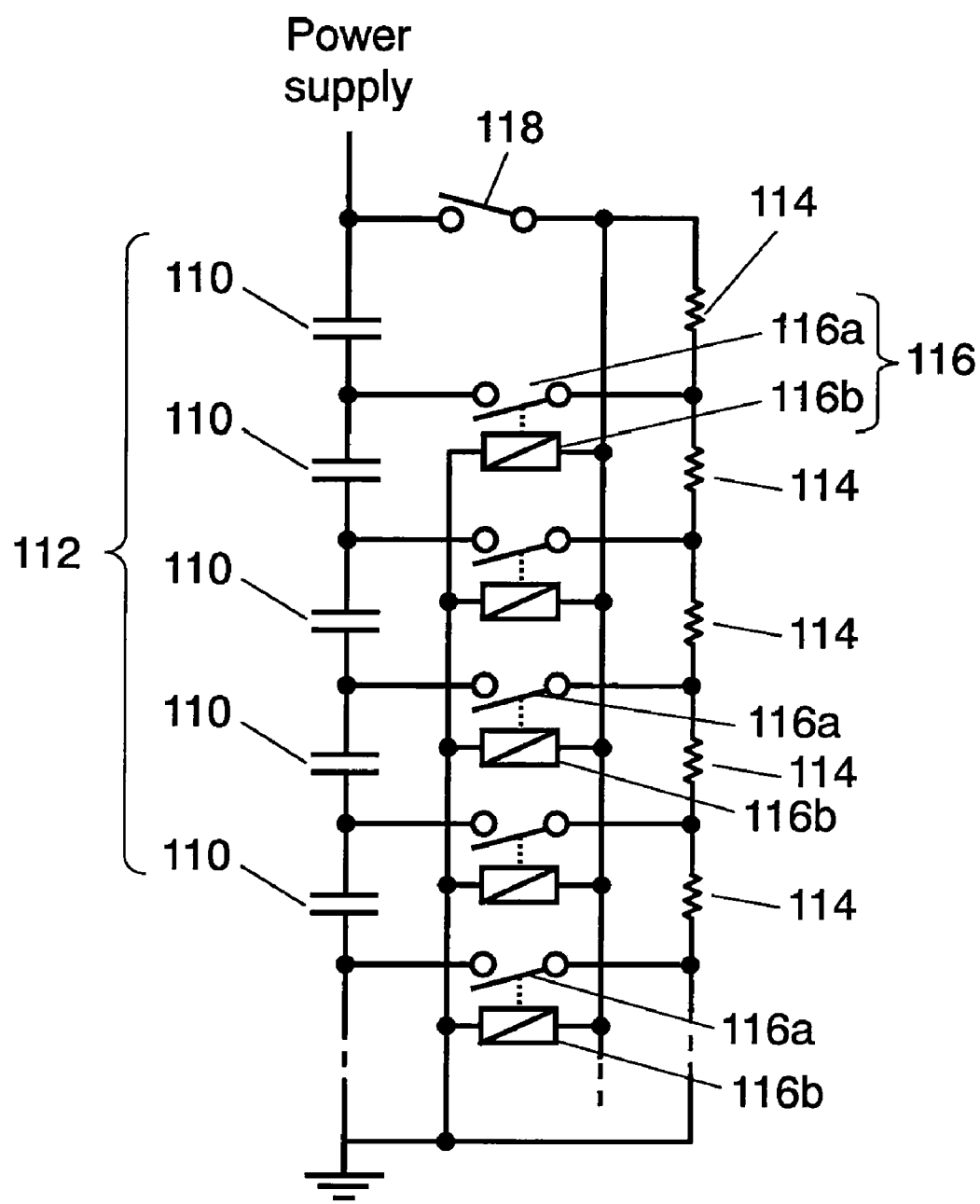
FIG. 13 shows a schematic circuit diagram of a conventional electric storage device.
Figure 14:
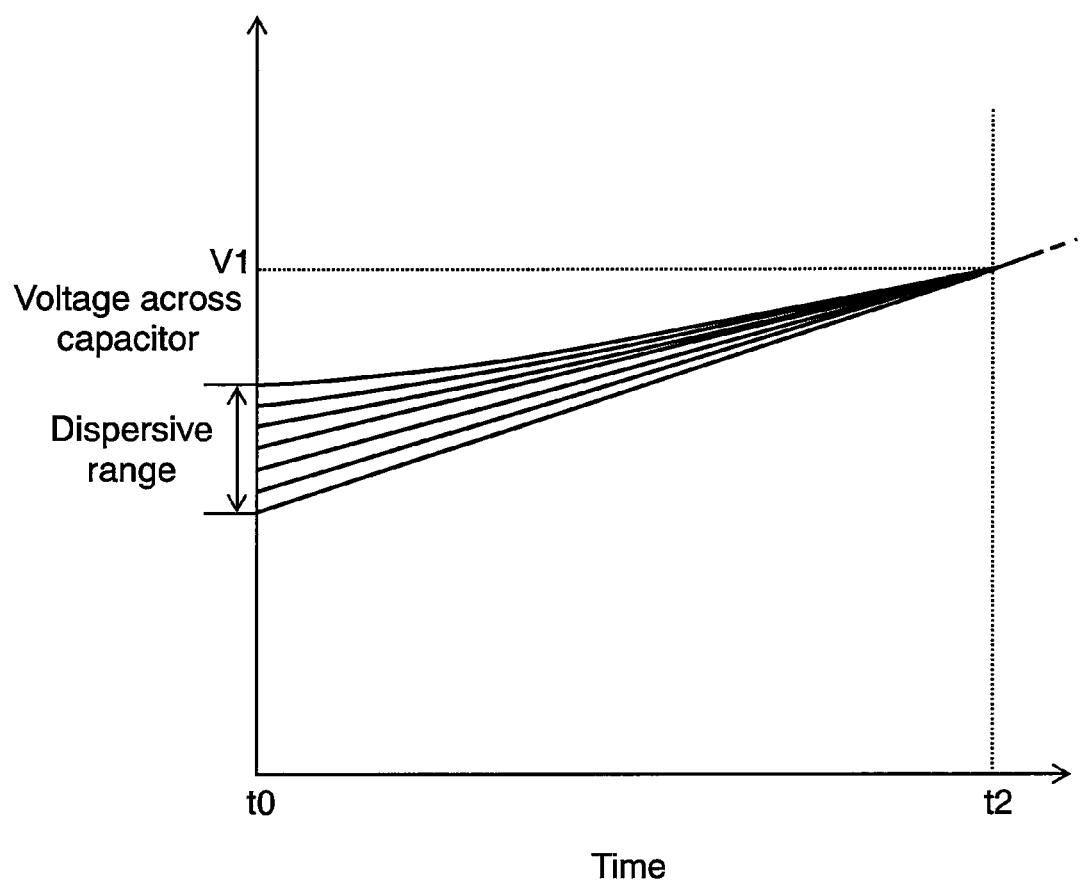
FIG. 14 shows a time-varying progress of voltages across respective energy storage device cells of the conventional electric storage device.

FIG. 8 shows a schematic circuit diagram of an electric storage device in accordance with the third embodiment of the present invention. FIG. 9 shows a time-varying progress of voltages across respective energy storage devices in the case of a greater charging current than a discharging current of the electric storage device in accordance with the third embodiment. FIG. 10 shows a time-varying progress of voltages across respective energy storage devices in the case of a smaller charging current than a discharging current of the electric storage device in accordance with the third embodiment. FIG. 11 shows another schematic circuit diagram of the electric storage device in accordance with the third embodiment. FIG. 12A shows a connection circuit where multiple energy storage devices are coupled in parallel with a single equalizing voltage circuit in the electric storage device in accordance with the third embodiment. FIG. 12B shows a connection circuit where multiple energy storage devices are coupled in series-parallel to a single equalizing voltage circuit in the electric storage device in accordance with the third embodiment.

In FIG. 8, elements similar to those in FIG. 1 have the same reference marks, and the descriptions thereof are omitted here. The structural features in FIG. 8 are following the three points:
(a) Voltages across each one of energy storage devices 1 can be measured.
(b) Respective discharging switches 9 can be turned on or off independently.
(c) Controller 10 is provided, which is capable of measuring the voltages across each one of energy storage devices 1 and controlling the turn-on or turn-off of respective balancing switches 5 and discharging switches 9.

The work of electric storage device 11 discussed above is demonstrated hereinafter. When the car is started-up, ignition switch 13 is turned on, then the power of battery 15 is controlled by charging circuit 12, thereby charring energy storage device 1. At this time, controller 10 turns on every balancing switch 5 simultaneously, and also measures the voltages across each one of energy storage devices 1, and then turns on every discharging switch 9 except the one that is connected to energy storage device 1 having the minimum voltage. As a result, energy storage devices 1 except one energy storage device 1 that has the minimum voltage start discharging to discharging resistors 7. Since the resistance value of balancing resistor 7 is greater than that of discharging resistor 7 by over 10 times, this is the same condition as that of the first embodiment, the discharge to discharging resistor 7 which is coupled to discharging switch 9 turned on supplies a greater current, i.e. greater than the current flowing to balancing resistor 3 by over 10 times.

The time-varying progress of the voltages across respective energy storage devices 1 at this state are shown in FIG. 9 and FIG. 10, in which the horizontal axis represents the time, and the vertical axis represents the voltages across respective energy storage devices 1. The statuses of the charging current and the discharging current in FIGS. 9 and 10 are the same as those in FIGS. 2 and 3.

First, in the case of FIG. 9, namely, when the charging current is greater than the discharging current with discharging resistor 7, is demonstrated hereinafter. The voltages across respective energy storage devices 1 at the start-up of the car (at time "t0") disperses within the dispersive range shown in FIG. 9. Assume that the charge starts in this status, where one energy storage device 1 having the minimum voltage (the lowest voltage in the dispersive range) is not coupled to discharging resistor 7. Only a small current thus flows to balancing resistor 3, and mostly the charge is carried out from time "t0", so that the voltage across this energy storage device 1 rises quickly. On the other hand, the other energy storage devices 1 are coupled with discharging resistors 7, so that the discharging current flows; however, since the charging current is greater than the discharging current, the voltage rises slower than the case where mostly the charge is carried out.

As a result, the voltage across energy storage device 1 having the minimum voltage rises closely to the present voltage (at time "t01") across energy storage device 1 having the next to the minimum voltage in an extremely short time. Controller 10 always measures the variation of this voltage, and assume that the difference between a voltage across any energy storage device 1 and the present voltage across energy storage device 1 having the minimum voltage falls within a given range (in this third embodiment, within 5% of the rated voltage of energy storage device 1) at time "t01", then controller 10 turns off discharging switch 9 coupled to energy storage device 1 having the voltage next to the minimum one, so that this energy storage device 1 can reduce its discharging current. The foregoing time "t01" is used as a given condition. The process discussed above allows energy storage device 1 having the voltage next to the minimum one to halt the discharge to discharging resistor 7. As a result, after the time "t01", this energy storage device 1 is mostly charged as the energy storage device 1 having the minimum voltage is. At this time, the voltage across energy storage device 1 having the voltage next to the minimum one is almost equal to that of the energy storage device 1 having the minimum voltage. Therefore, as shown in FIG. 9, the voltage across energy storage device 1 having the voltage next to the minimum one rises along the same slope as that of the energy storage device 1 having the minimum voltage, i.e. rises in accordance with the charging characteristics of the energy storage device 1 having the minimum voltage. The dispersion between these two energy storage devices 1 is thus eliminated at time "t01".

In a similar way to what is discussed above, when a difference between a voltage across energy storage device 1 having the third minimum voltage in the dispersive range and the voltage across energy storage device 1 having the minimum voltage falls within the given range at time "t02", controller 10 turns off discharging switch 9 coupled to this energy storage device 1 having the third minimum voltage. This action allows this energy storage device 1 to be mostly charged after time "t02", and at this time, the voltage across this energy storage device 1 becomes almost equal to the present voltage, i.e. the voltage at time "t02", across energy storage device 1 having the minimum voltage, so that the dispersion between these two energy storage devices can be eliminated at time "t02", and as shown in FIG. 9, the voltages of these two energy storage devices rise along the same slope thereafter.

Controller 10 repeats the foregoing action until every discharging switch 9 is turned off, so that although the voltages across respective energy storage devices 1 have been dispersed, the dispersion can be eliminated step by step, and at time "t1" and onward, almost no dispersion is found. Each one of energy storage devices 1 can be thus efficiently charged while the discharging current is reduced. In this state, since every balancing switch 5 remains turned-on, the charge can be carried out while the voltages can be balanced with each other.

The work discussed above allows balancing the voltages across respective energy storage devices 1 with each other extremely quicker than the conventional ones, and on top of that, the dispersion can be eliminated step by step in comparison with the first embodiment. Needless power consumption by discharging resistors 7 can be thus reduced accordingly. Because, in the first embodiment, discharging resistors 7 are turned on until the voltages across every energy storage device 1 are balanced with each other; on the other hand, in this third embodiment, discharging switches 9 coupled to energy storage devices 1, of which voltages are balanced with each other, are turned off sequentially, so that the currents flowing to discharging resistors 7 decrease step by step.

Next, in the case of FIG. 10, namely, when the charging current is smaller than the discharging current to discharging resistor 7, is demonstrated hereinafter. Assume that the voltages across respective energy storage devices 1 at the start-up of the car (at time "t0") disperse within the dispersive range shown in FIG. 10, and the charge starts in this status, where one energy storage device 1 having the minimum voltage (the lowest voltage in the dispersive range) is not coupled to discharging resistor 7. Only a small current thus flows to balancing resistor 3, and almost only the charge is carried out from time "t0", so that the voltage across this energy storage device 1 rises as discussed in FIG. 9. On the other hand, the other energy storage devices 1 are coupled with discharging resistors 7, so that the discharging current flows; however, since the charging current is smaller than the discharging current, the voltage lowers with a lapse of time.

As a result, a difference between the present voltage (at time "t01") across energy storage device 1 having the minimum voltage and the voltage across energy storage device 1 having the voltage next to the minimum one falls within the given range in an extremely short time. After this given condition, i.e. the fall-in within the given range, the same work as shown in FIG. 9 is carried out, namely, controller 10 turns off discharging switch 9 coupled to energy storage device 1 having the voltage next to the minimum one, so that this energy storage device 1 can reduce its discharging current.

The work discussed above allows energy storage device 1 having the voltage next to the minimum one to be mostly charged at time "t01" and on ward. At this time the voltage across this energy storage device 1 is almost equal to the present voltage (at time "t01") across energy storage device 1 having the minimum voltage, so that the dispersion between these two energy storage devices 1 is eliminated at time "t01". The voltages of these two energy storage devices 1 thus rise along the same slope after time "t01" as shown in FIG. 10.

Controller 10 repeats the foregoing work until every discharging switch 9 is turned off, so that every discharging switch 9 is turned off at time "t1", and at time "t1" and onward, almost no dispersion is found. This is the same status as discussed in FIG. 9. Each one of energy storage devices 1 can be thus charged while the discharging current is reduced. In this state, since every balancing switch 5 remains turned-on, the charge can be carried out while the voltages can be kept balancing with each other.

A work at the halt of the car, i.e. the use of electric storage device 11 is brought to an end, is similar to that described in the first embodiment, namely, controller 10 turns off every discharging switch 9 and every balancing switch 5. Needless power consumption can be thus reduced.

The work discussed above can be summarized as follows: Controller 10 discharges energy storage devices 1, except the one energy storage device 1 having the minimum voltage, with a large amount of current, and every time when the given condition is satisfied, (the difference between the present voltage across energy storage device 1 having the minimum voltage and the voltage across another energy storage device 1 falls within the given range), discharging switches 9 are turned off sequentially for reducing the discharging current.

In conclusion, discharging resistor 7 having a smaller resistance value than balancing resistor 3 is coupled in parallel with energy storage device 1, and energy storage devices 1 except the energy storage device 1 having the minimum voltage are discharged to discharging resistors 7, so that the voltages of energy storage devices 1 are balanced with each other sequentially. The structure and the work discussed above allows electric storage device 11 to balance the voltages with each other, even their dispersion is great, within a short time. On top of that, this electric storage device 11 can reduce needless power consumption.

The circuit structure of balancing resistors 3 and discharging resistors 7 of electric storage device 11 shown in FIG. 8 can also comprise the following elements as shown in FIG. 11:

balancing resistor 3 coupled in parallel with each one of energy storage devices 1;

balancing switch 5 coupled between each one end of respective energy storage devices 1 and respective balancing resistors 3;

discharging resistor 7 having a smaller resistance value than balancing resistors 3 and coupled in parallel with respective energy storage devices 1; and discharging switch 9 coupled between each one end of respective energy storage devices 1 and respective discharging resistors 7.

The other structures remain unchanged from that of FIG. 8. The foregoing structure allows producing an advantage similar to that described in FIG. 4 of the first embodiment.

In the embodiments 1-3, energy storage devices 1 are coupled together in series; however, they can be coupled together in series-parallel connection depending on the power required. The connecting circuit diagrams of energy storage devices 1 and equalizing voltage circuit 2 in accordance with this case are shown in FIG. 12A and FIG. 12B.

First, FIG. 12A shows an example where three energy storage devices 1 are coupled in parallel with one single equalizing voltage circuit 2. In this case, the voltages across each one of three energy storage devices 1 coupled in parallel, out of the series-parallel connection, become equal to each other, so that equalizing voltage circuit 2 is not needed to couple to each one of energy storage devices 1, but can be coupled to the common terminal of energy storage devices 1 of which voltages become equal due to the parallel connection.

FIG. 12B shows an example where three energy storage devices 1 coupled in parallel are coupled in series with another three energy storage devices 1 coupled in parallel, and this unit is coupled in parallel with equalizing voltage circuit 2. In this case, the voltages across energy storage devices 1 differ from each other at the series connection; however, in the case of smaller dispersion in performance of energy storage devices 1, a range of the dispersion in the voltages becomes smaller when energy storage devices 1 in series connection are used. Therefore each one of energy storage devices 1 is not necessarily connected to each one of equalizing voltage circuit 2. For instance, as shown in FIG. 12B, every six energy storage devices 1 can be coupled to one single equalizing voltage circuit 2.

As discussed above, equalizing voltage circuit 2 is not necessarily connected to each energy storage device 1 individually, but it can be connected to each group formed of multiple energy storage devices 1.

In embodiments 1-3, equalizing voltage circuit 2 comprises balancing resistor 3, balancing switch 5, discharging resistor 7 and discharging switch 9; however, the structure of circuit 2 is not limited to this one. For instance circuit 2 can employ a circuit in which a discharging current can be changed from the outside, e.g. an electronic load circuit or a constant current circuit.

In embodiments 1-3, an electric storage device is taken as an example of an auxiliary power supply for restarting the engine; however, the electric storage device of the present invention can be used as an vehicle auxiliary power supply employed in systems such as an idling stop system, an electric power steering system, an electric turbo system, or a hybrid system, and not only limited to the vehicle auxiliary power supply systems but also the electric storage device of the present invention is applicable to an emergency backup power supply for general purpose.

INDUSTRIAL APPLICABILITY

An electric storage device of the present invention allows balancing the voltages of energy storage devices with each other in a short time during the charge, so that the electric storage device can be useful as a vehicle auxiliary power supply or a backup power supply for emergency use.

The invention claimed is:

1. An electric storage device comprising:
a plurality of energy storage devices coupled together in series or in series-parallel; and
an equalizing voltage circuit coupled to the energy storage devices,
wherein when the energy storage devices are charged by an external charging device through a charging circuit,
a part of or a whole of a charging current is discharged by the equalizing voltage circuit from a start of the charge until a given time lapses or until voltages across each one of the energy storage devices reach a given voltage, and then
a discharging current for one or more of the energy storage devices is reduced for carrying out the charge while continuing to discharge the one or more of the energy storage devices.

2. The electric storage device of claim 1, wherein the equalizing voltage circuit includes:
   a balancing resistor coupled in parallel with each one of the energy storage devices, or coupled in parallel with each group formed of a plurality of the energy storage devices;
   a balancing switch coupled between an end of each one of the energy storage devices and each one of the balancing resistors; and
   a discharging resistor coupled in parallel with the balancing switch via a discharging switch and having a smaller resistance value than the balancing resistor.

3. The electric storage device of claim 2 further comprising a controller,
   wherein the controller turns on all the discharging switches and all the balancing switches of the equalizing voltage circuit at a start of charging the energy storage devices, and then
   when a given time lapses or respective voltages across each one of the energy storage devices reach a given voltage, the controller charges the energy storage devices with all the discharging switches turned off, and when
   use of the electric storage device is brought to an end, the controller turns off all the balancing switches.

4. The electric storage device of claim 2 further comprising a charging circuit and a controller,
   wherein the charging circuit is capable of supplying a charging current greater than a total electric current discharged from each one of the energy storage devices when all the discharging switches and all the balancing switches are turned on, and
   wherein the controller turns on all the discharging switches and all the balancing switches of the equalizing voltage circuit at a start of charging the energy storage devices, and when
      voltages across each one of the energy storage devices exceed a required voltage due to the charge, the controller turns off an output of the charging circuit, and when
      a given time lapses or the respective voltages across each one of the energy storage devices reach a given voltage, the controller turns on an output of the charging circuit and charges the energy storage devices with all the discharging switches turned off, and when
   use of the electric storage device is brought to an end, the controller turns off all the balancing switches.

5. The electric storage device of claim 1, wherein the equalizing voltage circuit includes:
   a balancing resistor coupled in parallel with each one of the energy storage devices, or coupled in parallel with each group formed of a plurality of the energy storage devices;
   a balancing switch coupled between an end of each one of the energy storage devices and each one of the balancing resistors;
   a discharging resistor coupled in parallel with each one of the energy storage devices and having a smaller resistance value than the balancing resistor; and
   a discharging switch coupled between an end of each one of the energy storage devices and each one of the discharging resistors.

6. The electric storage device of claim 5 further comprising a controller,
   wherein the controller turns on all the discharging switches of the equalizing voltage circuit at a start of charging the energy storage devices, and then when
      a given time lapses or respective voltages across each one of the energy storage devices reach a given voltage, the controller turns off all the discharging switches and charges the energy storage devices with all the balancing switches turned on, and when
   use of the electric storage device is brought to an end, the controller turns off all the balancing switches.

7. The electric storage device of claim 5 further comprising a charging circuit and a controller,
   wherein the charging circuit is capable of supplying a charging current greater than a total electric current discharged from each one of the energy storage devices when all the discharging switches and all the balancing switches are turned on, and
   wherein the controller turns on all the discharging switches of the equalizing voltage circuit at a start of charging the energy storage devices, and when
      voltages across each one of the energy storage devices exceed a required voltage due to the charge, the controller turns off an output of the charging circuit, and then when
      a given time lapses or the respective voltages across each one of the energy storage devices reach a given voltage, the controller turns on an output of the charging circuit and charges the energy storage devices with all the balancing switches turned on, and when
   use of the electric storage device is brought to an end, the controller turns off all the balancing switches.

8. An electric storage device comprising:
   a plurality of energy storage devices coupled together in series or in series-parallel, and the energy storage devices being charged by an external charging device through a charging circuit; and
   an equalizing voltage circuit coupled to the energy storage devices,
   wherein the equalizing voltage circuit includes:
      a balancing resistor coupled in parallel with each one of the energy storage devices, or coupled in parallel with each group formed of a plurality of the energy storage devices;
      a balancing switch coupled between an end of each one of the energy storage devices and each one of the balancing resistors;
      a discharging resistor coupled in parallel with the balancing resistor via a discharging switch and having a smaller resistance value than the balancing resistor; and
      a controller for measuring voltages across each one of the energy storage devices coupled to the equalizing voltage circuit, and for controlling on-off of the balancing switch and the discharging switch.

9. An electric storage device comprising:
   a plurality of energy storage devices coupled together in series or in series-parallel, and the energy storage devices being charged by an external charging device through a charging circuit; and
   an equalizing voltage circuit coupled to the energy storage devices,
   wherein the equalizing voltage circuit includes:
      a balancing resistor coupled in parallel with each one of the energy storage devices, or coupled in parallel with each group formed of a plurality of the energy storage devices;
      a balancing switch coupled between an end of each one of the energy storage devices and each one of the balancing resistors;

a discharging resistor coupled in parallel with each one of the energy storage devices and having a smaller resistance value than the balancing resistor;

a discharging switch coupled between an end of each one of the energy storage devices and each one of the discharging resistors; and a controller for measuring voltages across each one of the energy storage devices, and for controlling on-off of the balancing switch and the discharging switch.

10. The electric storage device of claim 8, wherein the controller turns on all the balancing switches at a start of charging the energy storage devices and turns on the discharging switches except one discharging switch that is coupled to one of the energy storage devices having a minimum voltage across the energy storage device, and when a difference between a voltage across any one of the energy storage devices and a present voltage across the one of the energy storage devices having the minimum voltage falls within a given range, the controller turns off the discharging switch coupled to the any one of the energy storage devices for reducing a discharging current of the any one the energy storage devices, and the controller repeats an action of this turn-off of the discharging switch until all the discharging switches are turned off, and then the controller charges the energy storage devices with the discharging current decreased, and when use of the electric storage device is brought to an end, the controller turns off all the discharging switches and all the balancing switches.

11. The electric storage device as defined in claim 2, wherein the balancing resistor has a resistance value greater than that of the discharging resistor by over 10 times.

12. The electric storage device of claim 9, wherein the controller turns on all the balancing switches at a start of charging the energy storage devices and turns on the discharging switches except one discharging switch that is coupled to one of the energy storage devices having a minimum voltage across the energy storage device, and when a difference between a voltage across any one of the energy storage devices and a present voltage across the one of the energy storage devices having the minimum voltage falls within a given range, the controller turns off the discharging switch coupled to the any one of the energy storage devices for reducing a discharging current of the any one the energy storage devices, and the controller repeats an action of this turn-off of the discharging switch until all the discharging switches are turned off, and then the controller charges the energy storage devices with the discharging current decreased, and when use of the electric storage device is brought to an end, the controller turns off all the discharging switches and all the balancing switches.

13. The electric storage device as defined in claim 5, wherein the balancing resistor has a resistance value greater than that of the discharging resistor by over 10 times.

14. The electric storage device as defined in claim 8, wherein the balancing resistor has a resistance value greater than that of the discharging resistor by over 10 times.

15. The electric storage device as defined in claim 9, wherein the balancing resistor has a resistance value greater than that of the discharging resistor by over 10 times.

* * * * *